US012742906B2

(12) United States Patent
Imaki et al.

(10) Patent No.: US 12,742,906 B2
(45) Date of Patent: Sep. 22, 2026

(54) WIND CONDITION LEARNING DEVICE, WIND CONDITION PREDICTING DEVICE, AND DRONE SYSTEM

(71) Applicant: Mitsubishi Electric Corporation, Tokyo (JP)

(72) Inventors: Masaharu Imaki, Tokyo (JP); Shumpei Kameyama, Tokyo (JP); Yusuke Ito, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 16 days.

(21) Appl. No.: 18/746,347

(22) Filed: Jun. 18, 2024

(65) Prior Publication Data

US 2024/0337773 A1 Oct. 10, 2024

Related U.S. Application Data

(63) Continuation of application No. PCT/JP2022/005311, filed on Feb. 10, 2022.

(51) Int. Cl.
*G01W 1/10* (2006.01)
*G05D 1/224* (2024.01)
(Continued)

(52) U.S. Cl.
CPC ............ *G01W 1/10* (2013.01); *G05D 1/2244* (2024.01); *G05D 1/606* (2024.01); *G05D 2101/15* (2024.01); *G05D 2109/254* (2024.01)

(58) Field of Classification Search
CPC .......... B64C 39/00; G01W 1/00; G01W 1/10; G05D 1/2244; G05D 1/2246; G05D 1/247;
(Continued)

(56) References Cited

U.S. PATENT DOCUMENTS

2008/0169975 A1* 7/2008 Yee .......................... G01S 13/50
342/26 R
2017/0350369 A1* 12/2017 Evans ..................... F03D 13/20
(Continued)

FOREIGN PATENT DOCUMENTS

CN 112782660 A 5/2021
JP 2003-203194 A 7/2003
(Continued)

OTHER PUBLICATIONS

German Office Action for German Application No. 11 2022 005 772.6, dated Nov. 7, 2024, with English translation.
(Continued)

*Primary Examiner* — Blake A Wood
(74) *Attorney, Agent, or Firm* — Birch, Stewart, Kolasch & Birch, LLP

(57) ABSTRACT

A wind condition learning device according to the present disclosed technique includes: an input terminal to which a learning data set is input; and a calculator including AI to perform learning on the basis of the learning data set, in which one piece of the learning data set is a wind condition altitude distribution model value following a power law on an inflow side, and the other piece of the learning data set includes a wind speed average value, a wind speed maximum value, turbulence energy, or turbulence intensity in a wind condition distribution of an environmental space obtained by simulation.

6 Claims, 10 Drawing Sheets

(51) Int. Cl.

| | |
|---|---|
| ***G05D 1/606*** | (2024.01) |
| ***G05D 101/15*** | (2024.01) |
| ***G05D 109/25*** | (2024.01) |

(58) Field of Classification Search

CPC ............... G05D 1/606; G05D 2101/15; G05D 2109/254; G08G 9/00; Y02A 90/10

See application file for complete search history.

(56) References Cited

U.S. PATENT DOCUMENTS

| | | | | |
|---|---|---|---|---|
| 2019/0145794 | A1* | 5/2019 | Ketchell, III ...... | G01C 21/3667 701/439 |
| 2019/0147753 | A1 | 5/2019 | Hendrian et al. | |
| 2020/0103552 | A1* | 4/2020 | Phelan .................... | G01W 1/10 |
| 2020/0264313 | A1 | 8/2020 | Newman et al. | |
| 2021/0088692 | A1* | 3/2021 | Bou-Zeid ................ | G01W 1/10 |
| 2021/0319705 | A1* | 10/2021 | Furumoto ................ | G08G 5/58 |
| 2022/0334802 | A1 | 10/2022 | Takagi et al. | |

FOREIGN PATENT DOCUMENTS

| | | | |
|---|---|---|---|
| JP | 2017-102760 | A | 6/2017 |
| JP | 2018-142302 | A | 9/2018 |
| JP | 2019-22258 | A | 2/2019 |
| JP | 2019-89538 | A | 6/2019 |
| JP | 2020-159725 | A | 10/2020 |
| JP | 2021-43598 | A | 3/2021 |
| WO | WO 2021/039164 | A1 | 3/2021 |

OTHER PUBLICATIONS

International Search Report (PCT/ISA/210) issued in PCT/JP2022/005311, dated Apr. 12, 2022.

Japanese Office Action for application No. 2022-536485 dated Jul. 19, 2022.

Kameyama et al., “Compact all-fiber pulsed coherent Doppler lidar system for wind sensing”, Applied optics, vol. 46, No. 11, Apr. 10, 2007, pp. 1953-1962.

Nabi et al., “Improving LiDAR performance on complex terrain using CFD-based correction and direct-adjoint-loop optimization”, Journal of Physics: Conference Series, vol. 1452, No. 1, IOP Publishing, 2020, total 10 pages.

* cited by examiner

FIG. 7

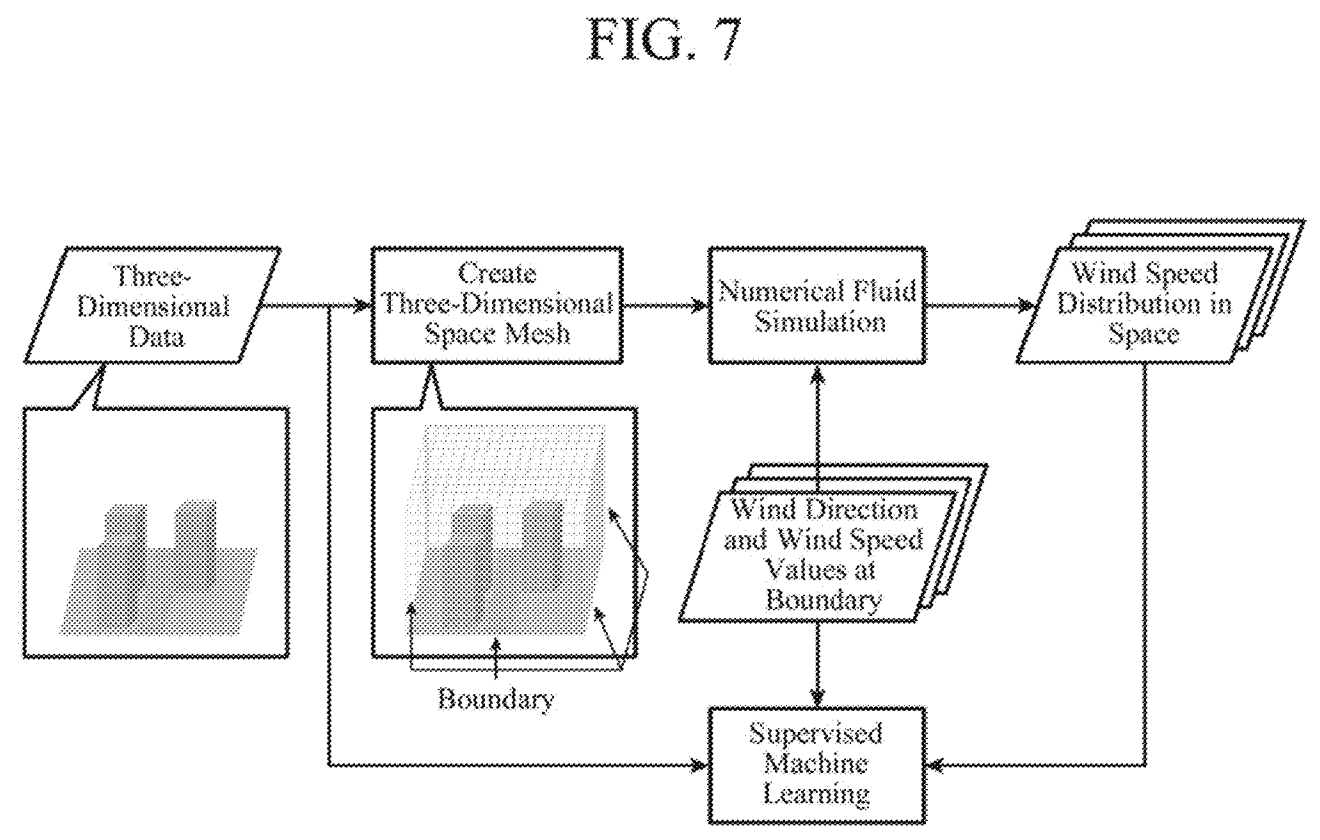

Three-Dimensional Data

Create Three-Dimensional Space Mesh

Boundary

Numerical Fluid Simulation

Wind Direction and Wind Speed Values at Boundary

Wind Speed Distribution in Space

Supervised Machine Learning

FIG. 10

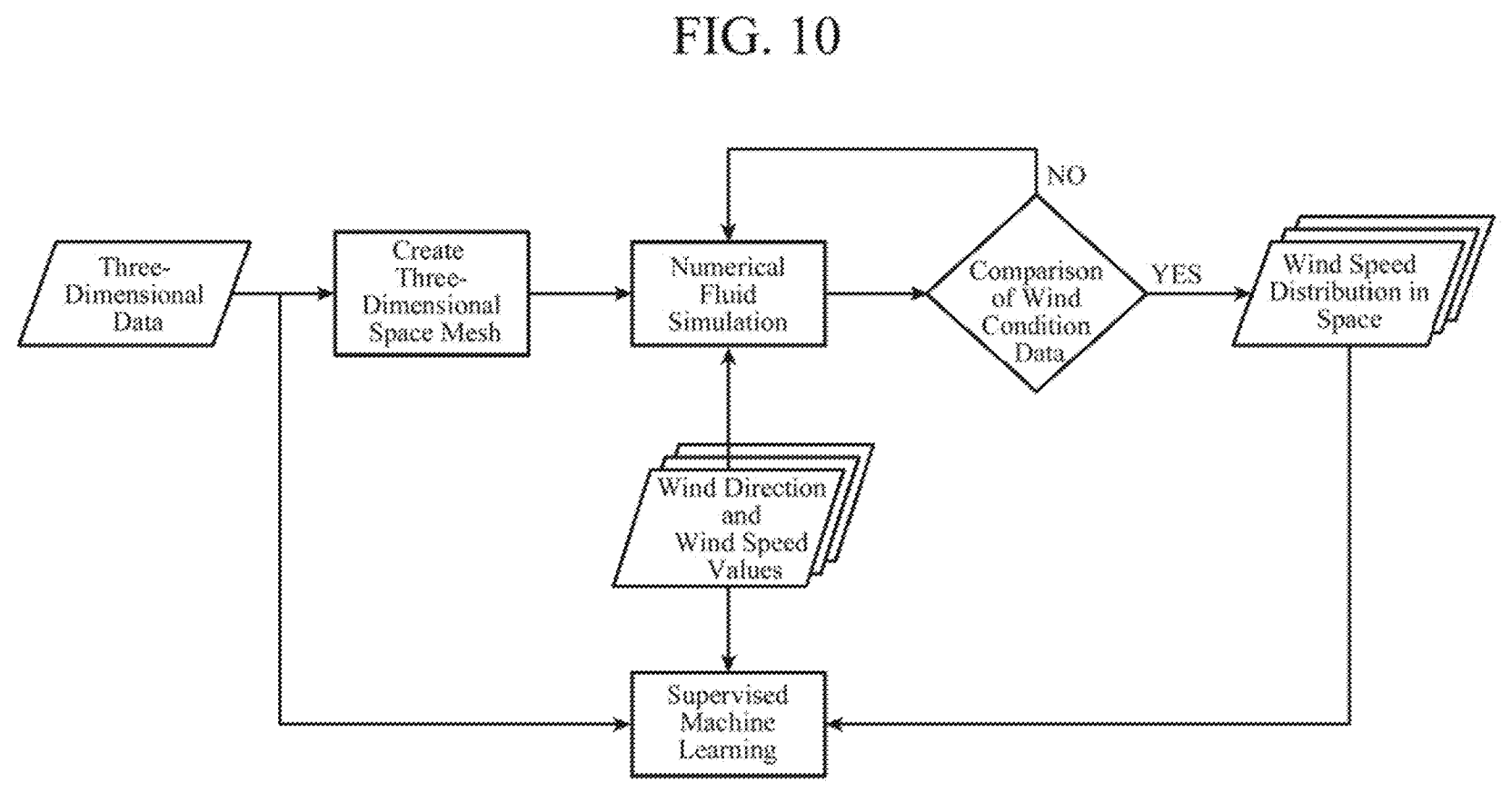

Three-Dimensional Data

Create Three-Dimensional Space Mesh

Numerical Fluid Simulation

Comparison of Wind Condition Data

NO

YES

Wind Speed Distribution in Space

Wind Direction and Wind Speed Values

Supervised Machine Learning

WIND CONDITION LEARNING DEVICE, WIND CONDITION PREDICTING DEVICE, AND DRONE SYSTEM

CROSS REFERENCE TO RELATED APPLICATION

This application is a Continuation of PCT International Application No. PCT/JP2022/005311, filed on Feb. 10, 2022, which is hereby expressly incorporated by reference into the present application.

TECHNICAL FIELD

The present disclosed technique relates to a wind condition learning device, a wind condition predicting device, and a drone system.

BACKGROUND ART

A Doppler LiDAR is known as a device that measures a wind condition. By increasing the number of measurement points of the Doppler LiDAR, it is possible to improve accuracy of measurement and prediction of the wind condition. In addition to measurement by the Doppler LiDAR, an idea of attempting to predict the wind condition by performing machine learning is disclosed.

For example, Patent Literature 1 discloses an idea of predicting a wind condition of an entire wind farm by machine learning on the basis of measurement information around the wind farm by the Doppler LiDAR.

CITATION LIST

Patent Literature

Patent Literature 1: JP 2019-22258 A

SUMMARY OF INVENTION

Technical Problem

It cannot be said that Patent Literature 1 discloses information on what kind of teacher data is used and what kind of machine learning makes prediction of a wind condition possible to an implementable extent.

An object of the present disclosed technique is to clarify a mode of machine learning that makes prediction of a wind condition possible.

Solution to Problem

A wind condition learning device according to the present disclosed technique includes: an input terminal to which a learning data set is input; and a calculator including AI to perform learning on the basis of the learning data set, in which one piece of the learning data set is a wind condition altitude distribution model value following a power law on an inflow side, and the other piece of the learning data set includes turbulence energy, or turbulence intensity in a wind condition distribution of an environmental space obtained by simulation.

Advantageous Effects of Invention

The wind condition learning device according to the present disclosed technique has the above configuration, and a mode of machine learning that makes prediction of a wind condition possible is clear.

BRIEF DESCRIPTION OF DRAWINGS

FIG. 7 is a schematic diagram illustrating a learning process of a wind condition learning device according to a first embodiment.

FIG. 10 is a schematic diagram illustrating a learning process of a wind condition learning device according to a third embodiment.

DESCRIPTION OF EMBODIMENTS

Figure 1:
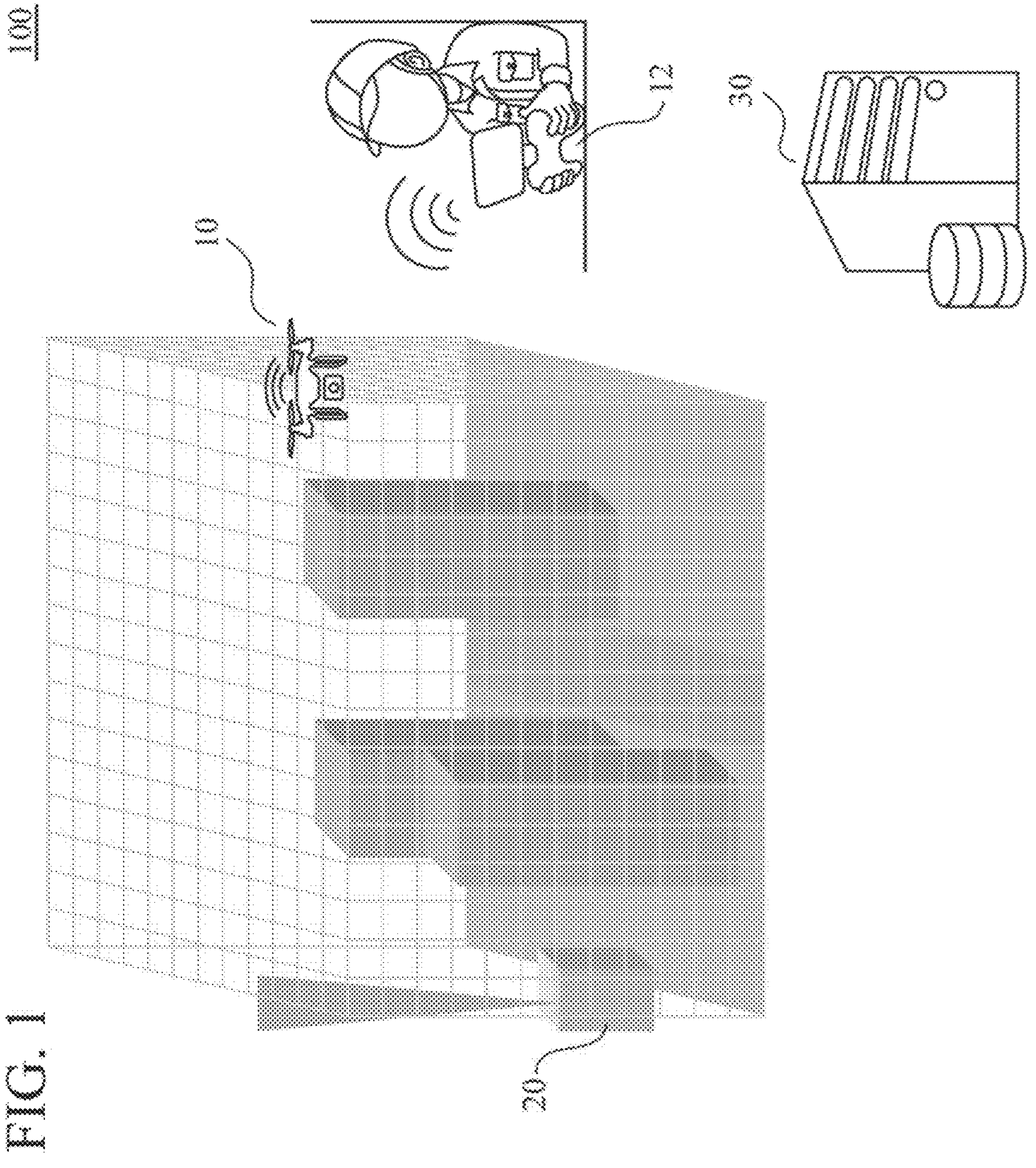
FIG. 1 is a schematic diagram illustrating a configuration of a drone system according to the present disclosed technique.

A wind condition learning device according to the present disclosed technique is a device using artificial intelligence (AI), and is applicable to, for example, a technical field of a drone. The wind condition learning device according to the present disclosed technique is in a learning phase of a wind condition predicting device 30 according to the present disclosed technique. In the present specification, the wind condition predicting device 30 according to the present disclosed technique will be described separately in a learning phase and an inferring phase. The wind condition predicting device 30 in the inferring phase only needs to include an AI model trained by the present disclosed technique, and does not need to include a learning function itself.

In a technical field of a drone also applied to infrastructure inspection, if real-time wind condition prediction can be performed, it is possible to prevent inadvertent movement of the drone due to wind pressure or the like and to contribute to safe flight. In general, performing accurate real-time wind condition prediction for a flight area of a drone that performs infrastructure inspection requires much observation data and a large calculation resource such as a supercomputer.

The wind condition predicting device 30 according to the present disclosed technique performs wind condition simulation assuming a large number of scenarios in advance, and causes the AI to learn a relationship between simulated observation data assuming a wind condition measuring instrument 20 and a wind condition in a flight area of the drone. When the drone is actually caused to fly, the AI predicts wind that may induce inadvertent movement of the drone at a flight point on the basis of actual observation data of the wind condition measuring instrument 20 obtained in real time, and issues a warning. Specifically, the wind condition measuring instrument 20 may be a light detection and ranging (LiDAR) that emits laser light, a radar that emits a microwave, or a sonar that emits a sound wave.

In general, wind means air that is moving. By the way, there are atmospheric phenomena on various time scales and space scales (hereinafter, referred to as "spatiotemporal scales") in the atmosphere, and there are also winds generated along with the atmospheric phenomena on various spatiotemporal scales, such as a gusty wind caused by a thunderstorm or a tornado, a local wind such as a sea-land wind, a strong wind caused by a typhoon, a large-scale wind such as a trade wind, and a jet stream, due to turbulence in the atmospheric boundary layer near the ground surface. Wind is classified depending on its average size and life, but there is a tendency that a wind having a large spatial scale has a long life.

Wind basically has a horizontal component, and usually has a small vertical component, but some winds have a large vertical component, such as a turbulent flow and a wind caused by a cumulonimbus cloud.

A standard of a wind speed at which the drone is caused to fly is generally said to be up to 5 [m/s]. In addition, even with a wind of about 4 [m/s] to 5 [m/s], the drone usually is not caused to fly in a situation where the wind is continuously blowing, for example, for several hours. Therefore, a target of a wind condition predicted by the wind condition predicting device 30 according to the present disclosed technique is a wind having a wind speed of about 4 [m/s] to 20 [m/s], and a life of seconds to minutes. A wind on a spatiotemporal scale in this range is also referred to as a "small turbulent vortex".

First Embodiment

FIG. 1 is a schematic diagram illustrating a configuration of a drone system 100 according to a first embodiment. As illustrated in FIG. 1, the drone system 100 includes a drone 10, a controller 12, a wind condition measuring instrument 20, and a wind condition predicting device 30. FIG. 1 illustrates a state in which the wind condition predicting device 30 of the drone system 100 predicts a wind condition of an environmental space including a flight area of the drone 10, for example, an environmental space in which an infrastructure facility is disposed in a case of infrastructure inspection.

The controller 12 is for piloting the drone 10. The wind condition predicting device 30 can communicate with the wind condition measuring instrument 20 in a wired or wireless manner, and can acquire an observation value of the wind condition measuring instrument 20. The wind condition predicting device 30 can also communicate with the controller 12 in a wired or wireless manner, and can transmit a wind condition predicting result to the controller 12.

Although one drone 10 is illustrated in FIG. 1, the present disclosed technique is not limited thereto. The drone system 100 may include two or more drones 10. In addition, although one wind condition measuring instrument 20 is illustrated in FIG. 1, the present disclosed technique is not limited thereto. The drone system 100 may include two or more wind condition measuring instruments 20.

Figure 2:
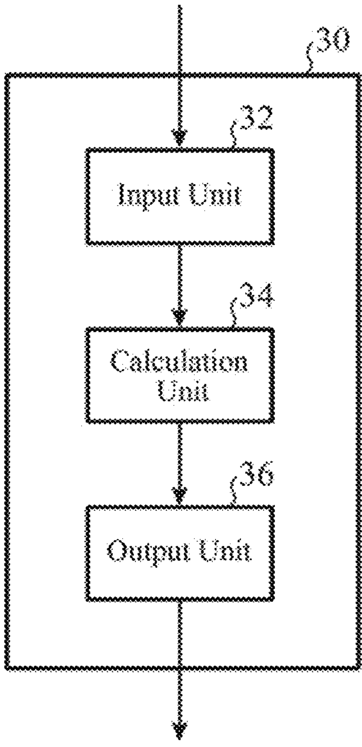
FIG. 2 is a block diagram illustrating functional blocks of a wind condition predicting device according to the present disclosed technique.

FIG. 2 is a block diagram illustrating functional blocks of the wind condition predicting device 30 according to the first embodiment. As illustrated in FIG. 2, the wind condition predicting device 30 includes an input unit 32, a calculation unit 34, and an output unit 36.

The input unit 32 is a functional block to which a learning data set is input. The learning data set is a set of pieces of learning data for supervised learning in the present disclosed technique. The learning data may be referred to as training data or teacher data. The learning data according to the present disclosed technique includes observation data of the wind condition measuring instrument 20 obtained by simulation, details of which will be clarified later.

The calculation unit 34 includes AI. The AI learns on the basis of the learning data. The learning here is supervised learning. More specifically, the learning may be machine learning, reinforcement learning, or deep learning.

The AI included in the calculation unit 34 may be a neural network such as a hierarchical neural network, an interconnection neural network, a deep neural network, a convolutional neural network, or a recursive neural network. In addition, the AI included in the calculation unit 34 may be a mathematical model that can be trained (also referred to as a "training model") other than the neural network.

The output unit 36 is a functional block for outputting a wind condition predicted and calculated by the calculation unit 34. Details of each of the functional blocks will be clarified later.

Figure 3:
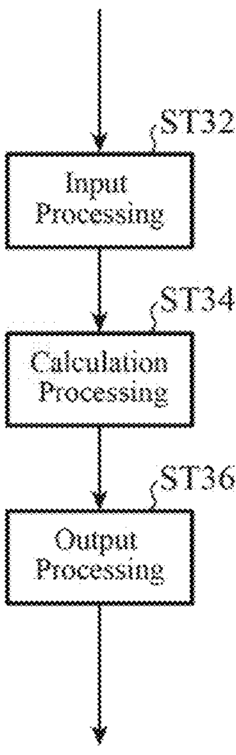
FIG. 3 is a flowchart illustrating processing steps of the wind condition predicting device according to the present disclosed technique.

FIG. 3 is a flowchart illustrating processing steps of the wind condition predicting device 30 according to the first embodiment. As illustrated in FIG. 3, the processing steps of the wind condition predicting device 30 include input processing ST32 performed by the input unit 32, calculation processing ST34 performed by the calculation unit 34, and output processing ST36 performed by the output unit 36.

Figure 4:
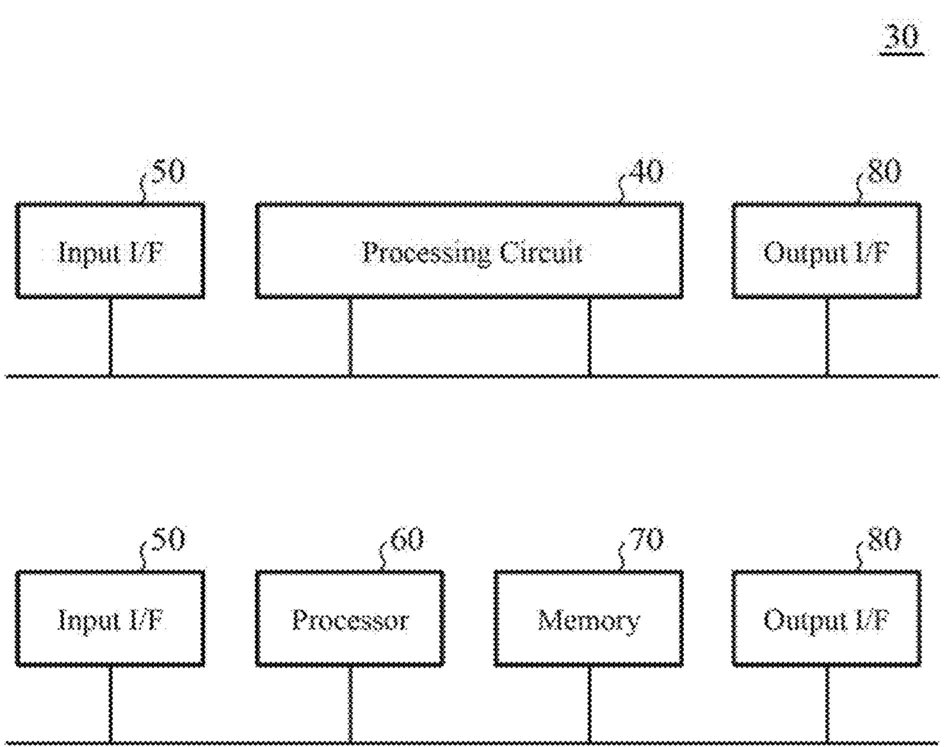
FIG. 4 is a diagram illustrating a hardware configuration of the wind condition predicting device according to the present disclosed technique.

FIG. 4 is a diagram illustrating a hardware configuration of the wind condition predicting device 30 according to the first embodiment. An upper part of FIG. 4 illustrates a case where functions of the wind condition predicting device 30 are executed by hardware. A lower part of FIG. 4 illustrates a case where functions of the wind condition predicting device 30 are executed by software.

As illustrated in FIG. 4, functions of the input unit 32, the calculation unit 34, and the output unit 36 in the wind condition predicting device 30 are implemented by a processing circuit. That is, the wind condition predicting device 30 includes a processing circuit for predicting a wind condition by performing input processing ST32, calculation processing ST34, and output processing ST36. The processing circuit may be dedicated hardware or a central processing unit (CPU, also referred to as a processing device, a calculation device, a microprocessor, a microcomputer, a processor, or a DSP) that executes a program stored in a memory.

In a case where the processing circuit is dedicated hardware, that is, in a case where the processing circuit is a processing circuit 40 illustrated in the upper part of FIG. 4, for example, a single circuit, a composite circuit, a programmed processor, a parallel programmed processor, an ASIC, a FPGA, or a combination thereof corresponds to the processing circuit 40. In the wind condition predicting device 30, the input unit 32, the calculation unit 34, and the output unit 36 each may be implemented by corresponding processing circuits 40, or the functions of the units may be collectively implemented by a single processing circuit 40.

In a case where the processing circuit is a CPU, that is, in a case where the processing circuit is a processor 60 illustrated in the lower part of FIG. 4, the functions of the input unit 32, the calculation unit 34, and the output unit 36 are implemented by software, firmware, or a combination of software and firmware. The software and the firmware are each described as a program and stored in a memory 70. By reading and executing the program stored in the memory 70, the processing circuit implements the functions of the units. That is, the wind condition predicting device 30 includes the memory 70 for storing a program that causes input processing ST32, calculation processing ST34, and output processing ST36 to be executed as a result when the program is executed by the processing circuit. It can also be said that these programs cause a computer to execute procedures and methods performed by the input unit 32, the calculation unit 34, and the output unit 36. Here, the memory 70 may be a nonvolatile or volatile semiconductor memory such as a RAM, a ROM, a flash memory, an EPROM, or an EEPROM. In addition, the memory 70 may be a magnetic disk, a flexible disk, an optical disk, a compact disk, a mini disk, or a DVD. Furthermore, the memory 70 may be an HDD or an SSD.

Note that some of the functions of the input unit 32, the calculation unit 34, and the output unit 36 may be configured by dedicated hardware, and some of the functions may be configured by software or firmware.

In this way, the processing circuit implements the functions of the wind condition predicting device 30 by hardware, software, firmware, or a combination thereof.

<Learning Phase>

It is conceivable that the wind condition predicting device 30 according to the present disclosed technique is applied to the drone system 100. By applying the wind condition predicting device 30 to the drone system 100, it can be expected to prevent inadvertent movement of the drone 10 due to wind pressure.

The wind condition predicting device 30 applied to the drone system 100 does not need to predict exact values of a wind speed and a wind direction of a wind that blows to the drone 10, and a time at which the wind blows to the drone 10. Rather, considering fail-safe, the wind condition predicting device 30 only needs to be able to issue a warning that wind that may cause inadvertent movement of the drone 10 will be generated after several seconds. Therefore, in an example of the wind condition predicting device 30, that is, the wind condition learning device in the learning phase, learning is performed in such a manner as to perform the fail-safe warning.

The present disclosed technique considers wind as a model in which the atmosphere, having a certain spatial scale, moves in a mass. Therefore, the present disclosed technique is based on the premise that if the leading edge of the air mass having a spatial scale can be captured, a subsequent behavior of the air mass can be predicted.

In general, classification and regression are conceivable as a supervised learning problem solved by AI. A problem solved by the AI of the calculation unit 34 according to the present disclosed technique can be said to be regression. Therefore, the learning data set input to the AI of the calculation unit 34 includes two types of data: data input as original data of prediction and referred to as an explanatory variable; and a correct answer label that is data output as a prediction result and referred to as an objective variable, and indicates a correct answer.

One piece of the learning data set input to the AI of the calculation unit 34 is an explanatory variable, and is, for example, a wind condition altitude distribution model value according to a power law on an inflow side which is windward. Here, the wind condition altitude distribution model value is a value used in simulation, and sets a wind direction and a wind speed on a wind inflow side for a two-dimensional plane including an altitude direction and a calculation area width direction.

All the wind direction values may be obtained by calculation, for example, at a pitch of 0.1 [deg]. All the wind speed values may be obtained by calculation, for example, at a pitch of 0.1 [m/sec]. In addition, one piece of the learning data set may be past observation data of the wind condition measuring instrument 20. The other piece of the learning data set to the AI is a correct answer label of an objective variable, and includes a wind speed average value, a wind speed maximum value, turbulence energy, or turbulence intensity in a wind condition distribution of an environmental space in which an infrastructure facility is disposed, obtained by the simulation. The turbulence energy and the turbulence intensity are indicators of a degree of turbulence. The wind condition of the environmental space may be, for example, a wind condition one minute after the wind condition measuring instrument 20 acquires observation data. The wind condition of the environmental space in the learning data set may be determined according to needs by design specifications such as how long it has elapsed after the observation data is acquired and whether frame advance is possible.

Note that the worst case of the wind condition distribution of the environmental space changes depending on the amount of scenario assumed in the simulation. Therefore, the amount of scenario assumed by the simulation may be determined according to needs by design specifications.

As described above, since the present disclosed technique desires to capture the leading edge of the air mass, the wind condition measuring instrument 20 is desirably disposed at a boundary of the environmental space with the outside world in a direction of observing the sky from the ground. In addition, a plurality of the wind condition measuring instruments 20 in the drone system 100 can be ideally prepared, but in a case where only one or two wind condition measuring instruments 20 can be prepared, a position that is likely to be windward with respect to the position of the drone 10 is preferably selected.

As for the number of the wind condition measuring instruments 20, the positions where the wind condition measuring instruments 20 are arranged, and directions in which the wind condition measuring instruments 20 are arranged, a mode in the learning phase is adapted to a mode used in the inferring phase.

Note that the wind condition measuring instrument 20 is assumed to be a Doppler LiDAR that emits laser light, but the present disclosed technique is not limited thereto. The wind condition measuring instrument 20 only needs to have a function of observing a wind condition at a boundary of the environmental space, and therefore may be a Doppler radar that emits a microwave or a sonar that emits a sound wave.

In order to represent a wind condition of the environmental space, the environmental space is divided into wire frame meshes as illustrated in FIG. 1. Each partial space divided in this manner is referred to as a small area of the environmental space. The wind condition of the environmental space is represented by allocating a vector representing a wind direction and a wind speed for each small area.

The environmental space is assumed to have a scale of approximately 300 [m] in height, 500 [m] in width, and 500 [m] in depth. A lattice interval for dividing the environmental space may be changed depending on topography and the shape of a structure, and is assumed to be, for example, about 1 [m] to 5 [m].

Assuming that the wind speed of a wind predicted by the wind condition predicting device 30 according to the present disclosed technique is 5 [m/s] and a wind condition of the environmental space is one minute after observation data is acquired, a group of the atmosphere advances by 300 [m] during this time. From this, it is appropriate to set the size of the environmental space when viewed from above to 500 [m] square.

In a case where the learning data set is generated by simulation, the simulation may use, for example, incompressible fluid analysis based on a Navier-Stokes equation. More specifically, the simulation may adopt a non-structural lattice and perform numerical calculation by a finite volume method. In the simulation, a generalized logarithmic law may be used for friction in a feature such as a building or a tree. For a friction on the ground surface in the simulation, a logarithmic law of roughness length may be used. For a boundary condition in the simulation, a power law may be used. For a turbulence model in the simulation, RNG or Realizable-k-ε may be used.

Figure 5:
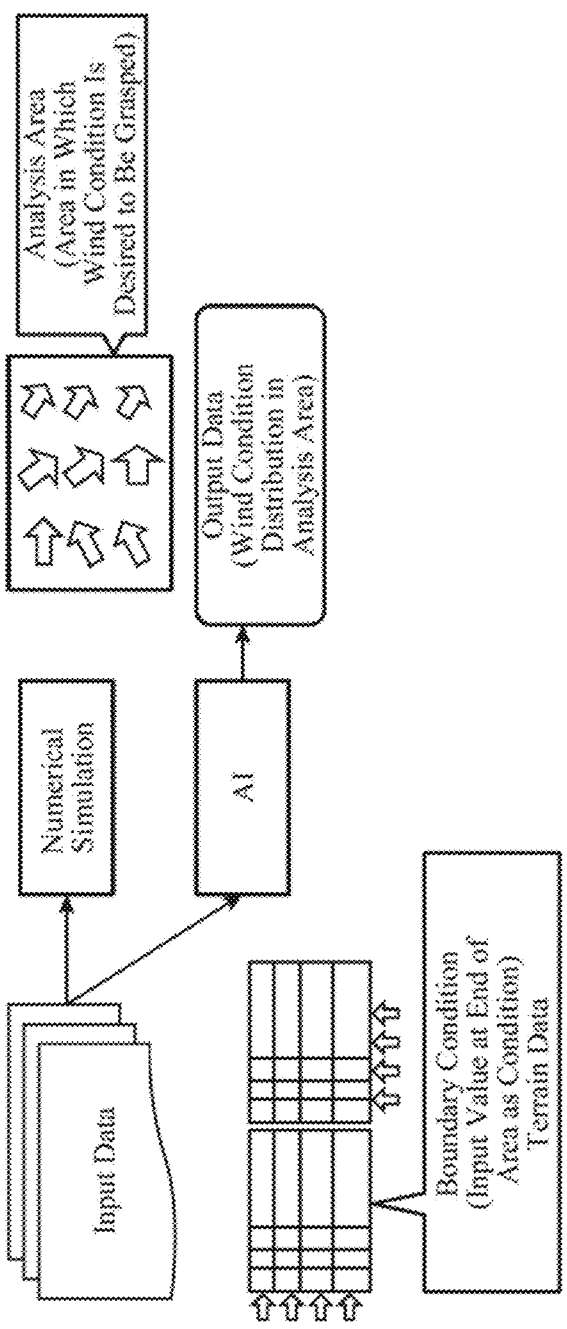
FIG. 5 is a schematic diagram illustrating a learning process of a wind condition learning device according to the present disclosed technique.

FIG. 5 is a schematic diagram illustrating a learning process of the wind condition learning device according to the present disclosed technique. A block of "numerical simulation" illustrated in FIG. 5 represents simulation for generating the above learning data set.

In the simulation, an environmental space is generated as a virtual space in such a manner as to include three-dimensional information of terrain and a feature (simply displayed as "terrain data" in FIG. 5).

A block of "input data" illustrated in FIG. 5 represents input information for performing numerical simulation, and specifically corresponds to a boundary condition at a boundary of the environmental space. The input data is preferably created assuming a large number of scenarios. Note that the input data for performing the numerical simulation is required for the length of the simulation. For example, in a case where a wind condition of the environmental space after one minute is simulated, the input data is also required from time 0 to time one minute. The input data for the wind condition simulation is preferably created using statistical data in consideration of an average scale and life of a small turbulent vortex.

In addition, an initial value, that is, an initial state of the wind condition to be simulated may be zero, that is, no wind in all the small areas in the environmental space.

As described above, an example of the present disclosed technique advances learning in such a manner as to perform fail-safe warning.

In the learning data set, as a boundary condition of an area where the simulation is performed, a method using a wind condition altitude distribution model value and a method using past weather data are conceivable. In addition, as the boundary condition, a method using the observation data of the wind condition measuring instrument 20 is conceivable. In a case where the observation data of the wind condition measuring instrument 20 is data in an area for learning, a plurality of simulation results in which the observation data is a solution may be calculated. This is because, in the present disclosed technique, the drone system 100 may include one wind condition measuring instrument 20. Inclusion of one wind condition measuring instrument 20 means that only a part of the input data in the numerical simulation is observed. The observation data of one wind condition measuring instrument 20 is not sufficient information for reproducing the wind condition of the environmental space.

In an example of the present disclosed technique, in order to perform a fail-safe warning, learning is advanced by taking an OR of the wind condition of the environmental space that can be varied on the basis of observation data of the wind condition measuring instrument 20, that is, by taking the worst case of each of small areas in the environmental space as positive. Here, the worst case means a vector in which the wind speed is a larger value.

<Inferring Phase>

Figure 6:
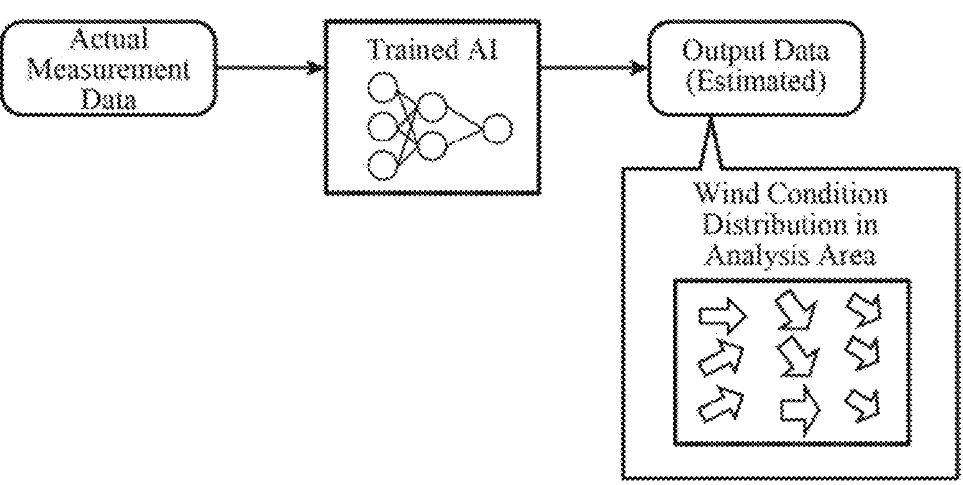
FIG. 6 is a schematic diagram illustrating an inferring process of the wind condition predicting device according to the present disclosed technique.

FIG. 6 is a schematic diagram illustrating an inferring process of the wind condition predicting device 30 according to the present disclosed technique. As illustrated in FIG. 6, the wind condition predicting device 30 in the inferring phase includes trained AI. More specifically, the calculation unit 34 of the wind condition predicting device 30 includes the trained AI. A block of "actual measurement data" illustrated in FIG. 6 represents observation data (hereinafter, referred to as "actual measurement observation data") of the wind condition measuring instrument 20 by actual measurement in the inferring phase. In addition, a block of "output data (estimated)" illustrated in FIG. 6 is an output of the trained AI, and represents the worst case wind condition of each of the small areas in the environmental space, obtained by learning.

Note that, in FIG. 6, the output of the trained AI is illustrated as "wind condition distribution in analysis area", but this distribution may vary depending on what learning data set is used in the learning phase. That is, in the learning phase, in a case where the wind condition of the environmental space in the learning data set is 30 seconds after observation data is acquired, output of the trained AI is also a predicted wind condition distribution 30 seconds after the observation data is acquired.

In the inferring phase, the output unit 36 of the wind condition predicting device 30 transmits the wind condition of the environmental space predicted by the trained AI to the controller 12 of the drone 10. The controller 12 of the drone 10 preferably includes a display that displays the transmitted predicted wind conditions of the environmental space. It is conceivable that the predicted wind condition of the environmental space is displayed as a wind direction value and a wind speed value, a heat map, and an arrow blade. In addition, information transmitted to the controller 12 of the drone 10 may be turbulence energy or turbulence intensity. Furthermore, the predicted wind condition of the environmental space may be area division that divides an area into safety and danger.

With this function, a pilot of the drone 10 can sense in advance a wind that may induce inadvertent movement of the drone 10.

In the drone system 100 according to the present disclosed technique, various modes of warning are conceivable. For example, on the basis of the predicted wind condition of the environmental space and the current position of the drone 10, the wind condition predicting device 30 may transmit a warning message that says "Be careful of wind that will be generated a few seconds later" to the controller 12 of the drone 10 in a dangerous state. A mode may be adopted in which the controller 12 notifies the pilot of the drone 10 of the warning message by emitting sound or light when the warning message is transmitted from the wind condition predicting device 30.

FIG. 7 is a schematic diagram illustrating a learning process of a wind condition learning device according to the first embodiment. FIG. 7 is for comparison with a learning process of a wind condition learning device according to a third embodiment described later. Details of the wind condition learning device according to the third embodiment will be clarified later.

Figure 8:
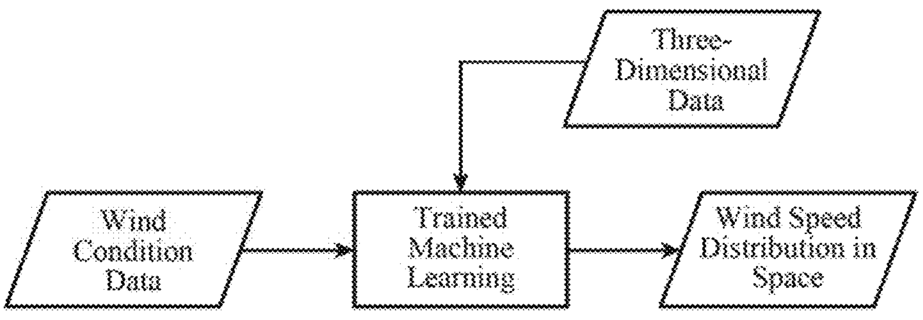
FIG. 8 is a schematic diagram illustrating an inferring process of the wind condition predicting device according to the first embodiment.

FIG. 8 is a schematic diagram illustrating an inferring process of the wind condition predicting device 30 according to the first embodiment. FIG. 8 is for comparison with an inferring process of a wind condition predicting device 30 according to a second embodiment described later. Details of the wind condition predicting device 30 according to the second embodiment will be clarified later.

As described above, the wind condition learning device according to the first embodiment has the above configuration, and a mode of machine learning that makes prediction of a wind condition possible is clear.

In addition, the wind condition predicting device 30 according to the first embodiment has the above configuration, and therefore can predict a wind condition that induces inadvertent movement of the drone 10. In addition, the drone system 100 including the wind condition predicting device 30 according to the first embodiment can prevent inadvertent movement of the drone 10 due to wind pressure or the like without requiring a guideline.

Note that the drone 10 is used for infrastructure inspection in the first embodiment, but the present disclosed technique is not limited thereto. The drone 10 may be used for transporting supplies or may be a flying car for carrying a person.

Second Embodiment

Figure 9:
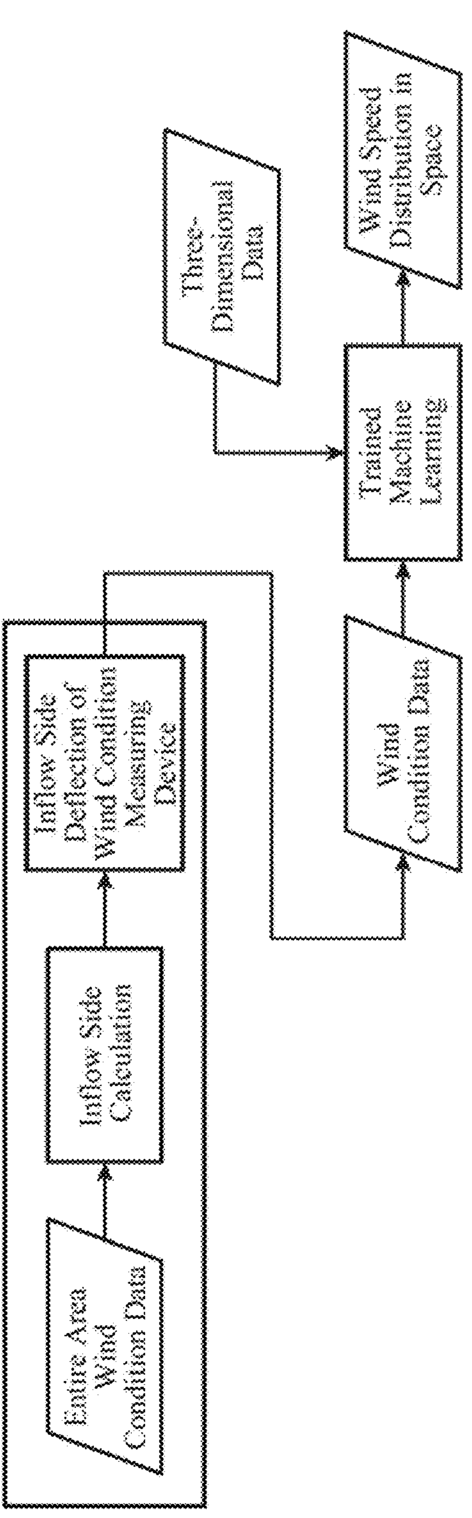
FIG. 9 is a schematic diagram illustrating an inferring process of a wind condition predicting device according to a second embodiment.

FIG. 9 is a schematic diagram illustrating an inferring process of the wind condition predicting device 30 according to the second embodiment. When FIG. 9 is compared with FIG. 8, the wind condition predicting device 30 according to the second embodiment includes processing steps of "entire area wind condition data", "inflow side calculation", and "inflow side deflection of wind condition measuring device".

The second embodiment focuses on the fact that it takes a large calculation resource or an enormous calculation time to perform numerical simulation of a wind condition of an environmental space on the basis of fluid dynamics, but once trained AI is created, calculation can be performed in real time by a general-purpose PC.

The block of "entire area wind condition data" illustrated in FIG. 9 means that the wind condition is roughly observed over the entire environmental space. A wind condition measuring instrument 20 according to the second embodiment is preferably disposed near a center of the environmental space instead of a boundary of the environmental space. In addition, the wind condition measuring instrument 20 according to the second embodiment can change a direction of observation, and also observes an area other than directly above a position where the wind condition measuring instrument 20 is disposed. The trained AI included in a calculation unit 34 of the wind condition predicting device 30 according to the second embodiment is trained by using a wind condition over the entire circumference of a boundary between the environmental space and the outside world as an explanatory variable and using a wind condition distribution of the environmental space as an objective variable.

The processing step of "inflow side calculation" illustrated in FIG. 9 means obtaining windward of wind blowing in the environmental space.

The processing step of "inflow side deflection of wind condition measuring device" illustrated in FIG. 9 means that the wind condition measuring instrument 20 according to the second embodiment is directed to windward of wind blowing in the environmental space.

With the above configuration, in addition to the effect described in the first embodiment, a drone system 100 according to the second embodiment has an effect of being able to respond to a change in a wind direction of wind blowing in the environmental space without moving a place where the wind condition measuring instrument 20 is disposed even when one wind condition measuring instrument 20 is available.

Note that the trained AI included in the calculation unit 34 of the wind condition predicting device 30 according to the second embodiment is trained by using a wind condition over the entire circumference of a boundary between the environmental space and the outside world as an explanatory variable and using a wind condition distribution of the environmental space as an objective variable. Inclusion of such trained AI means that a statistical wind condition distribution of the environmental space can be predicted by inputting statistical wind condition data at a point where the wind condition measuring instrument 20 is disposed. Here, the statistical wind condition data includes an average wind speed, a maximum wind speed, a minimum wind speed, and the like.

Third Embodiment

FIG. 10 is a schematic diagram illustrating a learning process of the wind condition learning device according to the third embodiment. When FIG. 10 is compared with FIG. 7, it can be found that there is a determination block described as "comparison of wind condition data" in the processing flow of the third embodiment.

As described above, the learning data set of the wind condition learning device according to the present disclosed technique may be the observation data of the wind condition measuring instrument 20 obtained by actual measurement and the wind condition of the environmental space obtained by actual measurement, instead of simulation. In the third embodiment, in the learning phase, a learning data set obtained by simulation is devised in such a manner as to be closer to a learning data set obtained by actual measurement.

The determination processing of "comparison of wind condition data" illustrated in FIG. 10 means that wind condition data obtained by simulation is compared with actually measured wind condition data. That is, in the third embodiment, the learning data set obtained by the simulation is brought close to that obtained by actual measurement by adjusting various conditions in the simulation and repeating trial and error.

With the above configuration, the wind condition learning device according to the third embodiment can bring the learning data set created by the simulation close to the actually measured learning data set, and can perform learning close to the actually measured learning data set.

INDUSTRIAL APPLICABILITY

The wind condition predicting device 30 according to the present disclosed technique can be applied to the drone system 100 for infrastructure inspection, and has industrial applicability.

REFERENCE SIGNS LIST

10: drone, 12: controller, 20: wind condition measuring instrument, 30: wind condition predicting device, 32:

input unit (input terminal), 34: calculation unit (calculator), 36: output unit (output terminal), 40: processing circuit, 50: input interface, 60: processor, 70: memory, 80: output interface, 100: drone system

What is claimed is:

1. A drone system comprising:

a drone configured to fly in an environmental space;

a controller configured to pilot the drone;

a wind condition measuring instrument;

a wind condition learning device; and a wind condition predicting device comprising:

an input terminal to which a learning data set is input;

a calculator including artificial intelligence (AI) to perform learning by referring to the learning data set; and an output terminal to output a wind condition distribution predicted and calculated, wherein one piece of the learning data set is a wind condition altitude distribution model value following a power law on an inflow side, and the other piece of the learning data set includes turbulence energy, or turbulence intensity in a wind condition distribution of the environmental space obtained by simulation, the wind condition measuring instrument is a light detection and ranging (LiDAR) instrument, a radar, or a sonar, and wherein the wind condition learning device is configured to divide an environmental area around the drone into wire frame meshes defining a plurality of small areas and allocating vectors to the small areas, wherein each of the vectors represents a wind direction and wind speed for a respective small area among the plurality of small are as; and wherein the drone system is configured to predict the wind condition distribution using the vectors of the plurality of small areas and the AI; and transmit a warning message to the controller by referring to the predicted wind condition distribution of the environmental space and a current position of the drone in a case where it is determined that a warning is necessary for the drone.

2. The drone system according to claim 1, wherein the other piece of the learning data sets is obtained by selecting a vector among the vectors of the plurality of small areas having a largest wind speed.

3. A drone system comprising:

a drone configured to fly in an environmental space;

a controller configured to pilot the drone;

a wind condition measuring instrument;

a wind condition learning device; and a wind condition predicting device comprising:

an input terminal to acquire actual measurement observation data of the wind condition measuring instrument;

a calculator including a trained artificial intelligence (AI), to predict and calculate a wind condition distribution of the environmental space by referring to the actual measurement observation data; and an output terminal to output the wind condition distribution predicted and calculated;

wherein, the wind condition distribution includes turbulence energy, or turbulence intensity, the wind condition measuring instrument is a light detection and ranging (LiDAR) instrument, a radar, or a sonar, and wherein the wind condition learning device is configured to divide an environmental area around the drone into wire frame meshes defining a plurality of small areas and allocating vectors to the small areas, wherein each of the vectors represents a wind direction and wind speed for a respective small area among the plurality of small areas, and wherein the drone system is configured to predict the wind condition distribution using the vectors of the plurality of small areas and the AI; and transmit a warning message to the controller by referring to the predicted wind condition distribution of the environmental space and a current position of the drone in a case where it is determined that a warning is necessary for the drone.

4. The drone system according to claim 3, wherein the trained AI is trained by using a wind condition over an entire circumference of a boundary between the environmental space and an outside world as an explanatory variable and using the wind condition distribution of the environmental space as an objective variable.

5. The drone system according to claim 3, wherein the controller includes a display.

6. The drone system according to claim 5, wherein the output terminal transmits the wind condition distribution to the controller in a mode of a wind direction value and a wind speed value, a heat map, an arrow blade, or area division of dividing an area into safety and danger, and the controller displays the transmitted wind condition distribution on the display.

* * * * *